(12) United States Patent
McCarthy

(10) Patent No.: US 10,790,656 B1
(45) Date of Patent: Sep. 29, 2020

(54) CONNECTOR BAR

(71) Applicant: Robert McCarthy, Bountiful, UT (US)

(72) Inventor: Robert McCarthy, Bountiful, UT (US)

( * ) Notice: Subject to any disclaimer, the term of this patent is extended or adjusted under 35 U.S.C. 154(b) by 0 days.

(21) Appl. No.: 16/364,162

(22) Filed: Mar. 25, 2019

(51) Int. Cl.
| | |
|---|---|
| H02G 15/08 | (2006.01) |
| H01R 11/09 | (2006.01) |
| H01R 43/048 | (2006.01) |
| H01R 13/621 | (2006.01) |
| H01R 4/38 | (2006.01) |
| H01R 4/24 | (2018.01) |
| H01R 4/18 | (2006.01) |

(52) U.S. Cl.
CPC ............. *H02G 15/08* (2013.01); *H01R 4/186* (2013.01); *H01R 4/24* (2013.01); *H01R 4/38* (2013.01); *H01R 11/09* (2013.01); *H01R 13/621* (2013.01); *H01R 43/048* (2013.01)

(58) Field of Classification Search
CPC .......... H02G 15/08; H01R 4/186; H01R 4/24; H01R 4/38; H01R 11/09; H01R 13/621; H01R 43/048
See application file for complete search history.

(56) References Cited

U.S. PATENT DOCUMENTS

| | | | |
|---|---|---|---|
| 3,107,132 A | 10/1963 | Smith | |
| 3,480,905 A | 11/1969 | Toedtman | |
| 3,546,364 A * | 12/1970 | O'Neel | H01R 11/03 174/72 R |
| 3,609,646 A | 9/1971 | Becker et al. | |
| 3,745,512 A | 7/1973 | Johnson et al. | |
| 5,050,131 A | 7/1991 | Boehm | |
| 5,137,476 A * | 8/1992 | Noble | H01R 4/36 439/793 |
| 5,199,905 A * | 4/1993 | Fillinger | H01R 4/34 439/723 |
| 5,533,913 A | 7/1996 | Boehm et al. | |
| 5,690,516 A | 11/1997 | Flllinger | |
| 5,915,998 A | 6/1999 | Stidham et al. | |
| 6,074,591 A * | 6/2000 | Privett | B29C 45/14 264/272.11 |
| 7,445,527 B1 * | 11/2008 | Carr | H01R 4/36 439/814 |
| D772,801 S * | 11/2016 | Sweeney | D13/102 |
| 2011/0211317 A1 * | 9/2011 | Lieberman | G06F 1/26 361/752 |

* cited by examiner

*Primary Examiner* — Abdullah A Riyami
*Assistant Examiner* — Nader J Alhawamdeh
(74) *Attorney, Agent, or Firm* — Amy Fiene; James Sonntag

(57) ABSTRACT

A bar connector comprises an elongate bar with a series of electrical attachment structures along a length of the elongate bar. Each wire electrical attachment structure is to secure at least one wire to the elongate bar. A flexible connector wire with two ends that connect to the elongate bar is used to establish an electrical connection between the at least one wire and a secondary distribution line by a crimp connector. A method of connecting an electrical wire with the bar connector is also claimed.

16 Claims, 6 Drawing Sheets

CONNECTOR BAR

BACKGROUND

For a typical house, crimp connectors are used to connect at least three electrical wires from a house to a secondary distribution line and thus provide and maintain power to the house. During inclement weather, the crimp connectors and wires to the house may become disengaged from the secondary distribution line. In such a situation, new crimp connectors are used to re-attach the wires to the secondary distribution line. Moreover, crimp connectors not only play an important role in establishing electrical connections for homes but also for other structures.

BRIEF DESCRIPTION OF DRAWINGS

The following is a description of drawings according to principles described herein.

DETAILED DESCRIPTION

Figure 1:
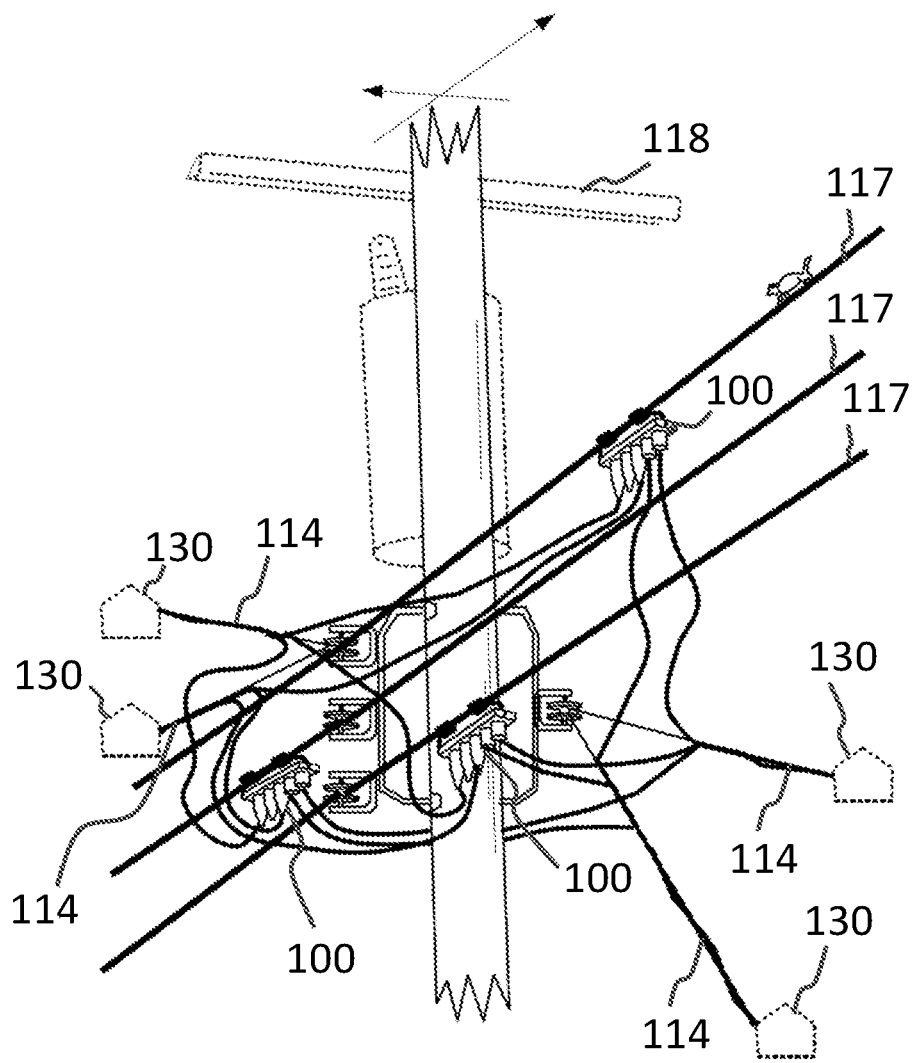
FIG. 1 illustrates a utility pole that incorporates connector bars.

The following describes one or more improvements to utility services, particularly, the electrical connections used to provide electrical services to a home.

A "service point" as used herein is the point of connection between the facilities of the serving utility and the premises wiring. In other words, the "service point" is the point of demarcation between the utility supply and the premises wiring system. A service point may be associated with a residential structure, small business structure, or the like.

A "service drop" or "service wire" is an overhead electrical line running from a utility pole to the service point at a customer's building or other premises.

Where the service point is at a utility pole, the service conductors from an overhead distribution system will originate at the utility pole and connect at the service disconnecting means. When the service point exists at the utility manhole, then the service conductors originate at the utility manhole and connect at the service disconnecting means.

A pole-mounted distribution transformer usually provides power for one or more residential structures. The service drop may comprise two 120 V lines and a neutral line. When these lines are insulated and twisted together, they are referred to as a "triplex cable" which may contain a supporting messenger cable in the middle of the neutral conductor to provide strength for long spans.

Often several customers are supplied from one transformer through "secondary distribution lines." Commercial and residential customers are connected to the secondary distribution lines through the service wires.

Unforeseen circumstances can break the service wires that establish a power connection to one's home, office building, or other structure with electrical services. For example, inclement weather such as a storm or wind can break a wire connection from a home to a utility pole. Another cause of a lost electrical connection may be due to a traffic accident that involves damage to a utility pole. The damage caused by weather or accident or other force may temporarily disrupt electrical services until a wire connection is repaired.

An average home has at least three electrical service wires. Each of the electrical wires is connected to a respective utility wire by a crimp connector, such as an H-tap or C-tap connector (Thomas and Betts connector). Other types of compression connectors or other types of connectors are further anticipated. When the wires get broken due to inclement weather or other reason, each of the crimp connectors must be replaced for each of the wires.

Each of the old crimp connectors must be thrown away and new crimp connectors used in their stead. Because there are different utility wires for each of the three electrical service wires from a home, the crimp connectors are not on the same service wire and may be quite spaced apart from each other. This may be difficult to do during bad weather. Also, the process may be time consuming because doing each connection requires time. There is no reuse for the old crimp connectors even though they may still remain attached on the electrical wires.

By providing re-usable bar connectors to establish electrical connections to utility wires, many issues of current electrical connections may be resolved. Instead of using an H-tap or C-tap for each and every wire, as little as one H-tap or C-tap crimp connector can be used for 6 or more wires. If a single wire becomes damaged or broken, it is possible that no crimp connectors would need to be replaced. If the bar connector holding the wires were to become damaged or broken, only two crimp connectors, or whatever the number of crimp connectors are that are suspending the bar connector would need to be replaced.

This is a significant improvement over current wiring systems. Less crimp connectors needing to be replaced is better for the environment. There is less work. The work that remains to be done is safer because the wires are centralized in the areas where the bar connectors are located making them easier to access. Electrical hazards are easier to spot and may be more easily avoided with wires being located in one place.

An exemplary bar connector comprises an elongate bar that includes a series of electrical attachment structures along a length of the elongate bar. Each attachment structure is to reversibly secure at least one service wire to the elongate bar. A flexible connector wire with two ends connects to the elongate bar to establish an electrical connection between the service wire and a secondary distribution line. At least one crimp connector is to secure the flexible connector wire to the secondary distribution line.

A set of bar connectors is anticipated for attaching a set of electrical service wires from a service point to corresponding secondary distribution lines. Each electrical service wire electrically corresponds to one of the secondary distribution lines and connects to corresponding secondary distribution lines with separate bar connectors.

A method for connecting one or more electrical service wires required for electrical service at a service point to a same number of secondary distribution lines, where each of the electrical service wires electrically corresponds to one of the secondary distribution lines, comprises, for each electrical service wire, attaching the electrical service wire to a bar connector. The bar connector comprises an elongate bar with a plurality of electrical attachment structures along a length of the elongate bar, and a flexible connector wire forming a loop that extends between two locations along the elongate bar. The electrical service wire is attached to the connector bar by means of one of the attachment structures. The elongate bar is secured to the corresponding secondary distribution line by attaching the flexible connector wire to the corresponding secondary distribution line with at least one crimp connector. This securement establishes an electrical connection through the bar connector and between the electrical service wire and its corresponding secondary distribution line. Each of the electrical service wires are connected to corresponding secondary distribution lines with separate bar connectors.

The method further anticipates connecting one or more additional electrical service wires required for electrical service at an additional service point to the secondary distribution lines, where each of the additional electrical service wires electrically correspond to one of the secondary distribution lines. Connecting additional service wires is accomplished by attaching separately each of the additional service wires to the attachment structure of the connector bar that is electrically connected to the secondary service line that corresponds to the service wire being attached.

The bar connectors are configured with multi connections. Once the bar connectors are attached to the full set of related secondary distribution lines, service connections to additional structures can be added by simply attaching each of the related service wires from the structure to an appropriate bar connector previously attached to the appropriate secondary distribution line. Installation of additional bar connectors is not required if previously installed bar connectors are close enough.

In order to secure the wires with crimp connectors, the method includes removing at least a portion of insulation from the flexible connector wire to expose a portion of the flexible connector wire that is underneath the portion of insulation. The exposed portion of the flexible connector wire is attached to a first portion of a crimp connector. The second portion of the crimp connector is attached to a secondary distribution line.

FIG. 1 illustrates a set of bar connectors 100 used to establish electrical connections for a plurality of structures represented by homes 130. The bar connectors 100 provide for multiple electrical connections, particularly, as many wires as there are electrical attachment structures on a particular bar connector. Moreover, the bar connectors 100 are reusable such that a break or damage in the wiring merely requires establishing repair of a connection from the damaged wire. This saves time and money and allows for an efficient restoration of working electricity to homes and other structures.

Figure 2:
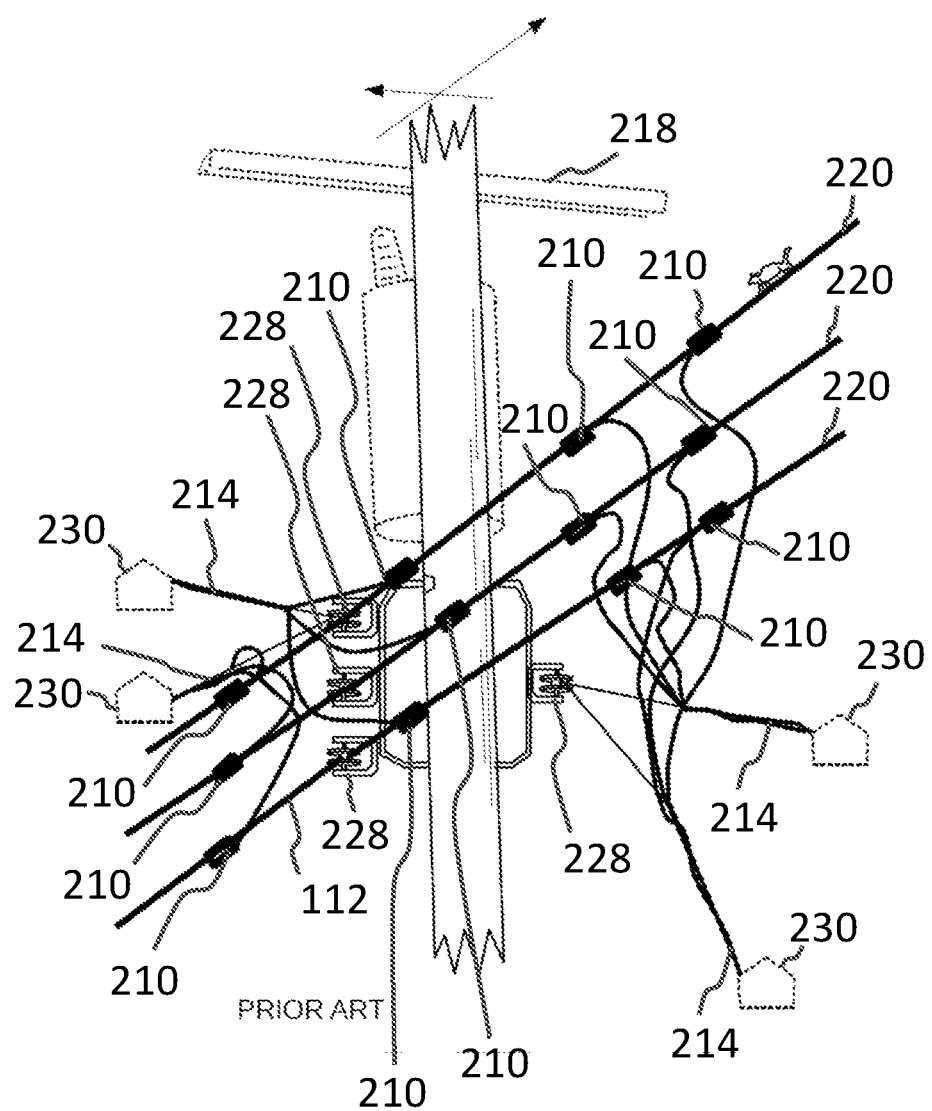
FIG. 2 illustrates a utility pole that includes connector bars.

FIG. 2 illustrates a convoluted nest of wires 214 that extend from homes 230 to secondary distribution lines 220 that are supported by a utility pole 218. In the example shown, a set of electrical service wires 214 are connected to secondary distribution lines 217 by crimp connectors 210. For the four homes 230 shown, a total of 12 crimp connectors are used.

The wiring appears prone to being tangled and becoming even more tangled when the lines are damaged and broken.

Other types of wiring configurations are anticipated which would also show crimp connectors or other connectors that establish wiring for homes and other structures to utility lines. The current systems in place are not aesthetically pleasing and are hung in a disorderly array. The wires are prone to adding to the amount of damage incurred when facing a natural disaster, such as a storm or heavy winds. One service wire or secondary distribution line torn from a utility line can easily snag other wires in the tangled mess and cause them to be torn off as well. With bar connectors 100, the system has a state of order that can be easily restored to that state of order after a natural disaster.

Figure 3:
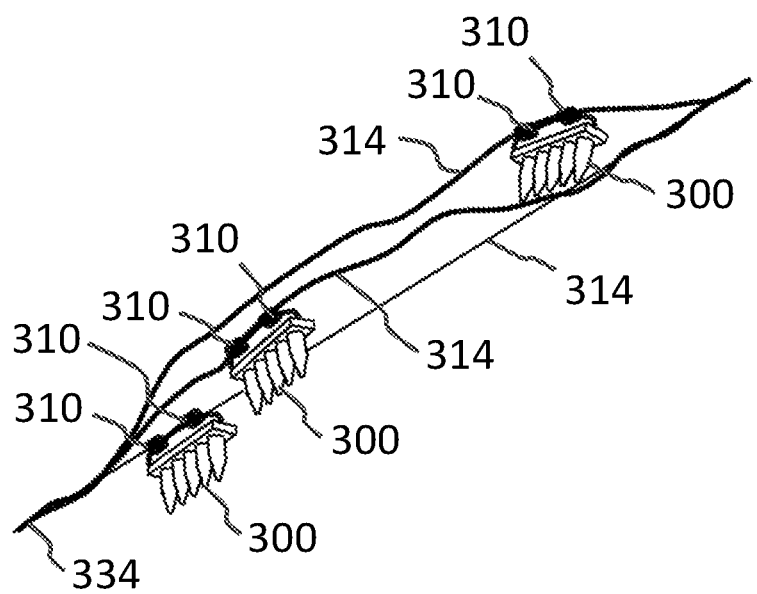
FIG. 3 illustrates a triplex wire that includes connector bars.

Bar connectors 100 find application with triplex cable 334 as shown in FIG. 3 as well as quadraplex cable (not shown) or other cables. The triplex cable 334 contains three individual service wires 314 twisted around each other: two insulated conductors called the "hot" legs of the service and a bare or uninsulated wire which is the neutral wire of the service. Each service wire 314 has a bar connector 300 attached to it by means of respective crimp connectors 310. The bar connectors 300 are to attach the wires of the triplex cable 334 from a point of service to respective secondary distribution lines.

Figure 4:
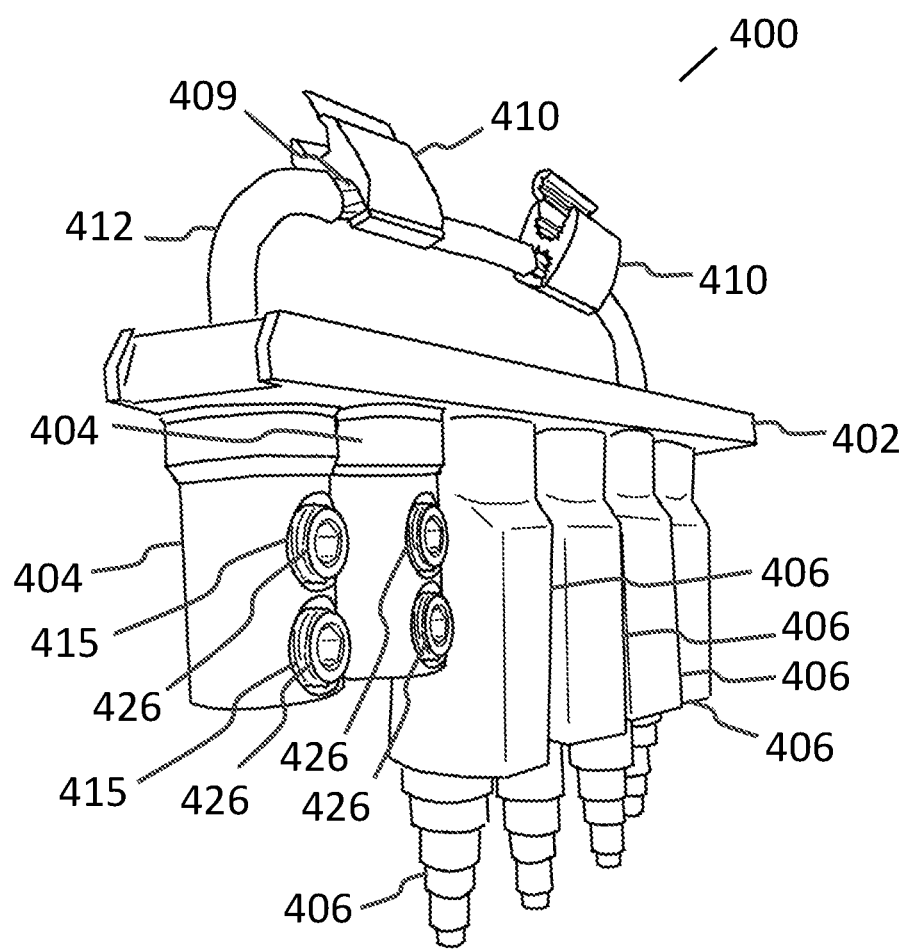
FIG. 4 illustrates a connector bar.

Turning to FIG. 4, a more detailed view of an exemplary bar connector 400 is shown. The bar connector 400 comprises an elongate bar 402 that has a conductive medium therethrough that may contact service wires through a plurality of electrical attachment structures 404 that attach to the service wires. The elongate bar 402 contains a conductive material to which service wires may be electrically attached through electrical attachment structures 404.

A flexible connector wire 409 that comprises a wire, stranded wire, or cable of wires extends from one side of the elongate bar to the other side. Ends of the flexible connector wire 409 are attached at or near ends of the elongate bar 402 to establish an electrical connection through the conductive medium. Service wires that are attached to the electrical attachment structures 404 are to be in electrical communication with the conductive material within the elongate bar and the flexible connector wire 409. Electricity from the secondary distribution line is passed to the flexible connector wire 409 and the elongate bar 402 to the service wires in the electrical attachment structures 404.

The electrical attachment structures 404 shown include a set of elongate members that extend outward from the elongate bar 402. The number of electrical attachment structures 404 may be 1-4, 4-6, 6-8, 8-10, or 10-12. The electrical attachment structures extend in a uniform manner and in a parallel direction. When the bar connector 400 is suspended from a utility wire, the electrical attachment structures tend to extend parallel to the force of gravity and point downward toward a ground surface. Each electrical attachment structure 404 includes an elongate member with a hollow therethrough in which a free end of a service wire from a home or other structure may be removably inserted and electrically connected. The hollow may have a closed bottom or an open bottom. Ends of service wires may attach to the conductive medium of the elongate bar through an open bottom. Alternatively, end portions of the service wires may be in electrical communication with the electrical medium of the elongate bar through wiring attachments or conductive surfaces or materials within the hollow. The fit of the service wire within the electrical attachment structure 404 is a form fit, friction fit or loose fit.

Locking structures are used to secure each service wire that is inserted within the elongate member of the electrical attachment structure. The electrical attachment structures 404 may include locking structures that lock end portions of wires. Exemplary electrical attachment structures include threaded openings that allow screw 426 tightening of end portions of the service wires within the hollow of the electrical attachment structures.

For example, one or more threaded holes 415 on an elongate member allows screws 426 to have a screw fit within the hole 415 and be screwed to secure the service wire within the elongate member. Two threaded holes 415 are shown along sides of the elongate members, the holes facing perpendicularly away from a lengthwise side of the elongate bar 402. The holes 415 are to allow the screws 426 to tighten respective service wires inserted within the elongate members.

Other types of electrical attachment structures and locking structures are anticipated such as a one bolt clamp having grooves on both sides, with one side on the wire or both sides with a wire, being a mechanical connection. Other electrical attachment structures and locking structures are anticipated such as bolted connections and crimp connections.

The electrical attachment structures 404 shown are located on one side of the elongate bar 402 while the flexible connector wire 409 is shown on an opposing side. The set of electrical attachment structures 404 are located adjacent to each other, either in contact with each other or separated a distance apart. Variations include the electrical attachment structures 404 being located at an angle relative to the elongate bar 402 or other arrangement.

While one service wire is described as going to one electrical attachment structure, it is also anticipated that multiple wires go to one electrical attachment structure. Examples include that electrical attachment structures be dimensioned for one wire or multiple wires.

The flexible connector wire 409 and the elongate bar 402 are protected by an insulated covering. They, along with the electrical attachment structures 404 and end caps 406, may be of the same or different material.

Exemplary materials include one or more of polypropylene, PVC, glass, asbestos, rigid laminate, resin, paper, Teflon, plastic, rubber, polymer, silicone, treated cloth, and oil-based products.

Although the flexible connector wire 409 described is flexible so as to form a loop around the elongate bar 402, and be somewhat malleable, alternatives include a rigid connector wire with materials that make the connector wire rigid and not malleable.

In practice, a portion of the covering is removed to expose a portion of the flexible connector wire 409. A crimp connector is secured to the exposed portion of the flexible connector wire 409 over and around the exposed portion. The crimp connector may be secured by crimping, compressing, or otherwise tightening or locking with locking structure a portion of the crimp connector 410 around the flexible connector wire. Another portion of the crimp connector 410 is used to be secured to a secondary distribution line.

The number of crimp connectors depends on the length of the elongate bar and the number of electrical attachment structures. For the six electrical attachment structures shown, two crimp connectors may be used. More or less crimp connectors may also be used.

As shown, the crimp connector includes two sets of jaw-like members, each jaw-like member having two claws or hooks that are brought nearer together such that end portions of the claws or hooks are close to each other or in contact to form a closed position. Initially, the claws facing each other are spaced apart with ends not touching in an open position.

The two sets of jaw-like members are shown facing opposite directions, however, variations include the jaw-like members facing at relative angular directions that are less than 180 degrees. Various types of crimp connectors may be used and are anticipated.

Figure 5:
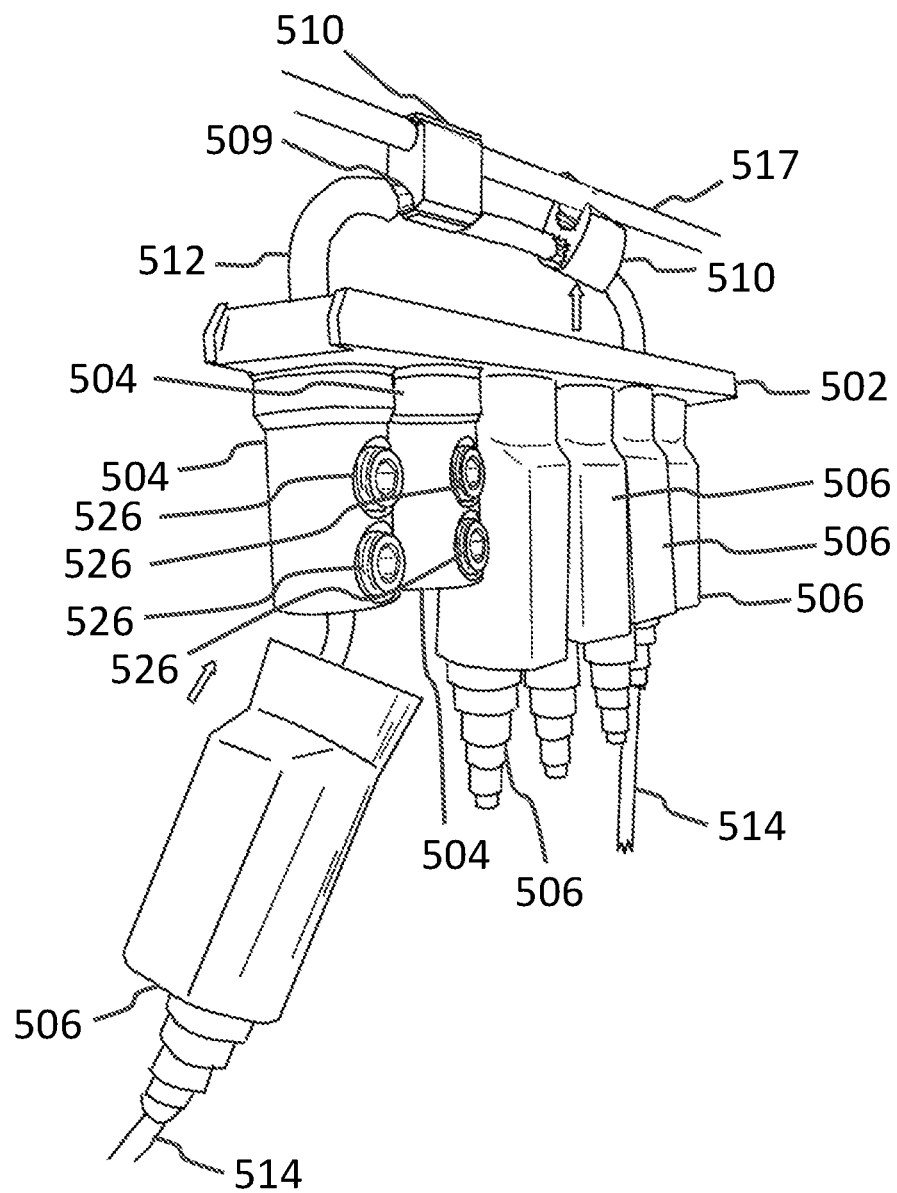
FIG. 5 illustrates a connector bar.

On top of the electrical attachment structures are placed end caps. Turning to FIG. 5, at one end of the elongate bar 502, an end cap 506 is shown being placed over an electrical attachment structure 504. Next to the end cap, an electrical attachment structure 504 is left bare. Next to the bar electrical attachment structure 504 are end caps 506 secured to respective electrical attachment structures 504.

Each end cap comprises an elongate member with a hollow therethrough to slidably fit over the electrical attachment structures with a tight or snug friction fit. As shown, an end cap includes a larger portion for securing around the electrical attachment structure at one side and a narrow portion on the other side that fits more securely around a service wire that passes therethrough. The hollow of the larger portion is generally cylindrical, however opposing sides are straight and a side in between the two straight sides is jutted outward to provide space that accommodates the locking structure of the electrical attachment structure. A top portion of the larger portion has a threaded interior for a screw type fit with the electrical attachment structure.

Variations include that the end cap have a completely cylindrical larger portion or other exterior formation. The top portion of the larger portion may be smooth or have a rough surface, for example with bumps or other surface texture.

The narrow portion is tapered in a stepped manner. The narrow portion has a relatively narrower interior and exterior cross section overall. Variations include that the narrow portion be cylindrical like the larger portion. Variations further include that the entire body be of one shape and size or have other structural variation that secures the wire within the electrical attachment structure. Furthermore, examples include that there be no end cap and that the wire be secured by the electrical attachment structure alone.

Service wires 514 are passed through openings located at bottoms of the end caps and through openings located at tops of the end caps. End portions of insulative coverings on the service wires 514 may be removed to expose end portions of the service wires 514 inside the hollow openings of the electrical attachment structures. Alternatively, no insulative covering may be removed.

The end caps 406 are secured over the electrical attachment structures 504 with a tight, friction fit. The end caps 406 include a material that is made of one or more of plastic, rubber, silicone, or other material described herein that allows for a good grip and friction fit.

Figure 6:
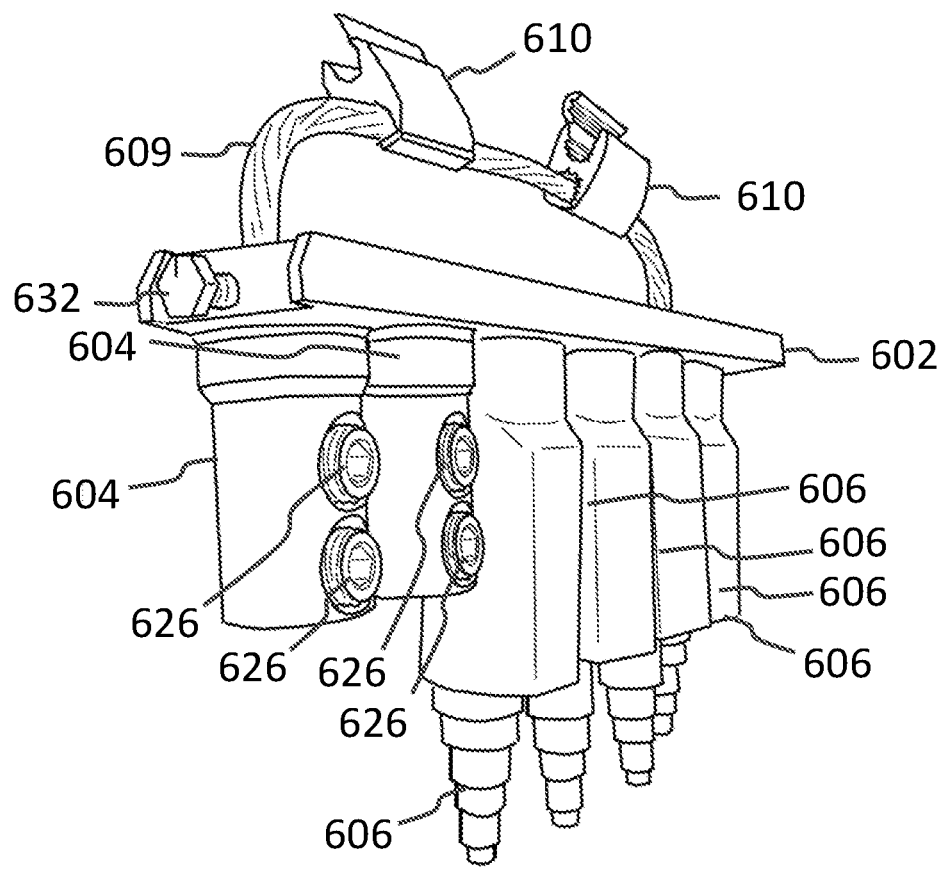
FIG. 6 illustrates a connector bar.

Turning back to the flexible connector wire, another variation of the flexible connector wire includes that it be secured by screws or bolts. Turning to FIG. 6, flexible connector wire 609 is secured at or near ends of the elongate bar 602 with bolts 632 that are screwed through ends of the elongate bar 602. The electrical connection as described above that provides for the wires to be electrically connected through the elongate bar and flexible connector wire to a secondary distribution line is still supported.

Note that a variation of the flexible connector wire 609 is shown as being fully exposed.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A bar connector comprising:
   an elongate bar;
   a series of electrical attachment structures along a length of the elongate bar, each attachment structure to secure at least one service wire to the elongate bar, each service wire associated with a different triplex wire;

a flexible connector wire with two ends attached to opposing sides of the elongate bar, the connector wire attached to the at least one service wire to establish an electrical connection between the at least one service wire to a wire of secondary distribution line; and at least one removable crimp connector to secure the flexible connector wire at variable location along the flexible connector wire to the wire of the secondary distribution line.

2. The bar connector in claim 1, further comprising a set of bar connectors for attaching a set of service wires from a service point to corresponding wires of secondary distribution lines, each service wire electrically corresponding to one wire of a secondary distribution line and connected to the one wire of the secondary distribution line with a separate bar connector.

3. The connector bar of claim 1, wherein the connector wire is a solid wire or a stranded wire.

4. The bar connector of claim 1, wherein the connector wire is covered by an insulative covering and a portion of the insulative covering is to be removed to expose wire in a location where the at least one crimp connector is to connect the connector wire to the secondary distribution line.

5. The bar connector of claim 4, wherein the insulative covering includes one or more of polyurethane, neoprene, plastic-based insulation, jute wire, polypropylene, PVC, glass, asbestos, rigid laminate, resin, paper, Teflon, plastic, rubber, polymer, silicone, treated cloth, and oil-based products.

6. The bar connector of claim 1, wherein the electrical attachment structures comprise a set of elongate members that extend outward from the elongate bar, each elongate member having a hollow therethrough in which at least one service wire may be removably inserted.

7. The bar connector of claim 4, wherein the electrical attachment structures include at least one locking structure for securing the at least one service inserted into the opening.

8. The bar connector of claim 4, wherein the locking structures include screws.

9. The bar connector of claim 1, wherein the at least one crimp connector is an H-tap connector.

10. A bar connector comprising:
an elongate bar with a conductive medium therethrough;
a series of electrical attachment structures along a length of the elongate bar, each attachment structure to attach at least one wire from a service line to the elongate bar such that the at least one wire contacts the conductive medium, each wire attached to the attachment structure coming from a separate triplex service line or other distinct service line;
a flexible connector wire that includes two ends that attach to opposing sides of the elongate bar such that the two ends contact the conductive medium; and
at least one removable crimp connector having a first jaw-like member to make a first crimped connection to the connector wire, the at least one removable crimp connector having an opposing second jaw-like member to make a second crimped connection to a wire of a secondary triplex distribution line, an electrical connection established between the wire of the secondary triplex distribution line to the connector wire to the conductive medium to the at least one wire from the service line.

11. The bar connector of claim 10, further comprising a separate bar connector for each wire of a secondary triplex distribution line such that service wires from service lines can be attached to separate bar connectors in establishing electrical connections with respective wires of the secondary distribution line.

12. The bar connector in claim 1, further comprising a set of bar connectors for attaching a set of service wires from a service point to corresponding wires of secondary distribution lines, each service wire electrically corresponding to one wire of a secondary distribution line and connected to the one wire of the secondary distribution line with a separate bar connector.

13. The bar connector of claim 10, further comprising an end cap that slidably fits over a portion of the electrical attachment structures and service wires to protect an attachment with a friction fit.

14. The bar connector of claim 10, further comprising an elongate conductive medium contained within the elongate bar;
the electrical connection supported through mutual contact of the connector wire and the at least one service wire to the elongate conductive medium, the ends of the connector wire contacting opposing sides of the conductive medium and the end of the at least one service wire contacting a side of the conductive medium.

15. A bar connector comprising:
an elongate bar;
a series of electrical attachment structures spaced apart lengthwise on the elongate bar, each attachment structure to secure at least one service wire to the elongate bar;
a flexible connector wire with two free ends, each free end attached to a long end of the elongate bar forming a loop,
a plurality of removable crimp connectors to secure the flexible connector wire at variable locations along the loop of the connector wire to a wire of a secondary distribution line, the elongate bar being secured to the wire of the secondary distribution line with a long axis of the elongate bar generally in parallel with the wire of the secondary distribution line,
an electrical connection established between mutual contact of the wire of the secondary distribution line, the connector wire, and the at least one wire of the service line.

16. The bar connector of claim 15, each electrical attachment structure including an opening that faces perpendicular to the long axis of the elongate bar on an opposing side of the loop formed by the flexible connector wire.

* * * * *